Patented June 15, 1943

2,321,803

UNITED STATES PATENT OFFICE 2,321,803

DIRECTION SIGNAL CIRCUIT

Robert N. Falge, George W. Onksen, Jr., and Howard I. Slone, Anderson, Ind., assignors to General Motors Corporation, Detroit, Mich., a corporation of Delaware Application August 2, 1940, Serial No. 349,830

2 Claims. (Cl. 177—337)

This invention has to do with a direction signal especially designed for use on automobiles. It is an improvement on the type of system described and claimed in Bell Patent No. 2,122,508 granted July 5, 1938, in which stop lights at the front and rear of the car which are energized when the brake is applied are also employed for direction signals by flashing the stop lights on the side toward which the turn is being made; and in which the stop lights on the other side are caused to burn steadily when the brake is applied.

According to the present invention stop lights are provided at the rear of the car only and special lamps or special filaments are provided at the front of the car for use as direction signals only. This reduces the drain on the battery without substantial impairment of signaling since stop signals are of little use at the front of the car. The front direction signals may be brought into action either by suitable switch arrangements or by the use of relays or the like.

Another improvement consists in cutting out the usual tail lights when the direction signals are actuated. By cutting out the tail lights the flashing of the direction signal is made more distinct because of greater contrast.

Other features of the invention will be pointed out in the course of the following description taken in connection with the accompanying drawings in which.

On all the figures the signal lights are indicated as right front, right rear, left front and left rear. These signals may consist of incandescent lamps having a single filament or may consist of one of the filaments of a two filament bulb. For example, it will be found convenient in the case of the front lights to combine in one bulb a low candlepower parking filament with a high candlepower direction signal filament. The lamps may be mounted as usual at the four corners of the car, preferably in the fenders. It will be found desirable in the case of the front lights to mount them some distance from the headlamps to give better contrast.

There is indicated on each of the figures a brake switch, this being the usual stop light switch operated mechanically, hydraulically or otherwise from the brake pedal so as to give a warning signal when the brake is applied.

There is also shown in each figure a pilot lamp which may be mounted on the dash adjacent the driver. The pilot is preferably flashed during the operation of the direction signal to inform the driver that the signals are working properly.

Figure 1:
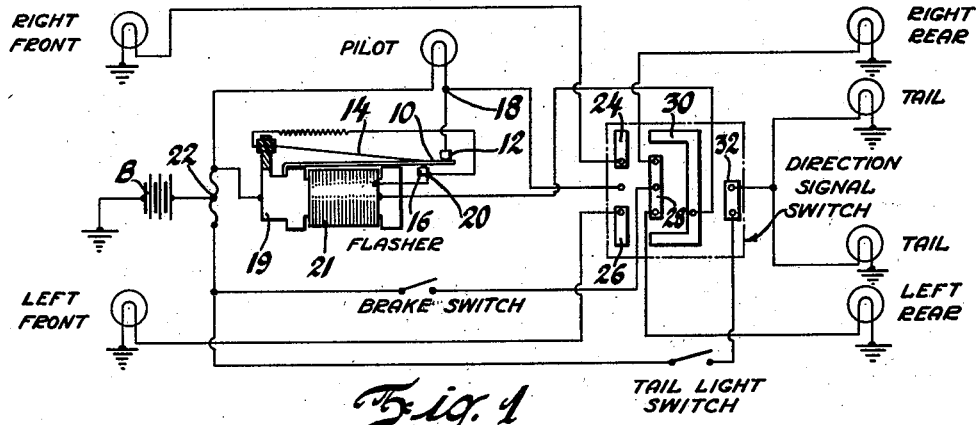
Figure 1 is a diagrammatic view showing the preferred form of direction signal system.
Figure 2:
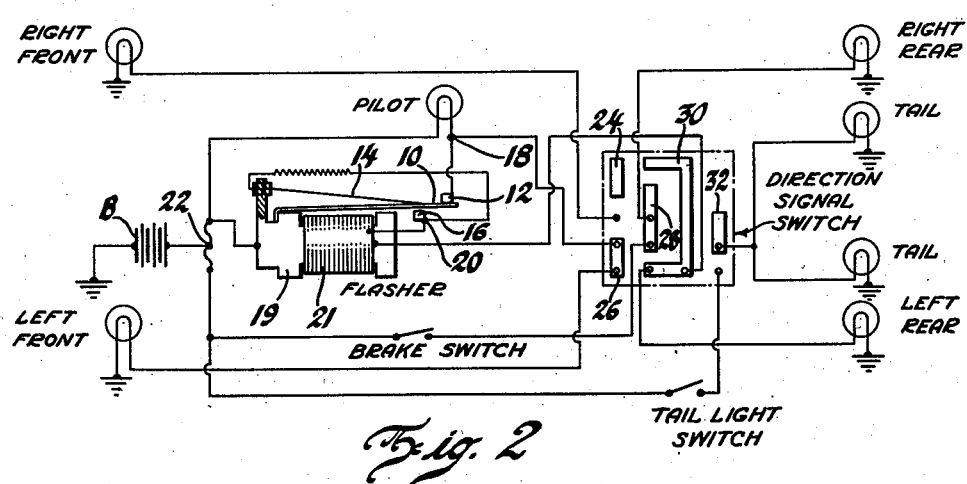
Figure 2 is the same as Figure 1 but shows the direction signal switch in position to indicate a left turn.

The flasher shown in Figures 1 and 2 is preferably of the construction described in detail in copending application of Falge and Onksen, S. N. 159,219, filed August 16, 1937, which has matured into Patent No. 2,282,956, dated May 12, 1942. The flasher is shown schematically as consisting of an armature 10 normally held in engagement with contact 12 by the tension of expansible wire 14. As current, checked to an appropriate extent by the resistor 15, flows through the wire 14 it is heated and expands, permitting the armature 10 to break its engagement with contact 12 and to engage contact 16, armature 10 being spring-biased toward contact 16. As wire 14 is now short-circuited there is no current flowing through it and it soon cools, contracts and pulls armature 10 away from contact 16 into engagement with contact 12. By this arrangement an interrupted current is supplied alternately to each of the output terminals 18 and 20 of the flasher. In order to insure a quick break and minimize arcing at the contacts the frame 19 of the flasher may be provided with a winding 21 in series with output terminal 16, thereby providing an electromagnet tending to hold armature 10 engaged with contact 16 and to quickly release the armature when the tension of wire 14 becomes sufficiently great. The pilot lamp is connected between output terminal 18 and the input terminal 22 so that it is flashed alternately with the signal lights supplied with current through terminal 18.

The direction signal switch of Figures 1 and 2 is illustrated as a simple reciprocating switch having a neutral position, a right turn position and a left turn position. It is shown diagrammatically on the figures as consisting of insulated conducting segments 24, 26, 28, 30 and 32, all of which move together and cooperate with corresponding stationary contacts as hereinafter described.

The usual tail lamps are indicated on Figures 1 and 2 as normally supplied with current from the battery B through the usual lighting switch, diagrammatically indicated, and conducting segment 32 when the direction signal switch is in neutral position.

When the switch is in this position current may also be supplied from the battery B to the stop lights by closing the brake switch, current then passing from the switch through conducting segment 28 to the rear stop lights. No current flows through the flasher unless the direction signal switch is moved to left or right indicating position for the circuits from both output terminals 18 and 20 of the flasher are open at the direction signal switch.

In indicating a left turn the direction signal switch is moved to the position shown in Figure 2. In this position of parts, current from the battery, interrupted by the flasher, is supplied from output terminal 18 of the flasher through switch segment 26 to the left front direction signal light. At the same time interrupted current is supplied from output terminal 20 of the flasher through winding 21 and switch segment 30 of the direction signal switch to the left rear stop light. At the same time the tail lights are disconnected even though the lighting switch be closed because contact is broken at segment 32 of the direction signal switch.

Should the brake switch be closed with the direction signal switch in direction indicating position, as shown in Figure 2, steady current is supplied through conducting segment 28 to the right rear stop light.

Thus with the parts in the position indicated in Figure 2 the left front direction signal light and the left rear stop light are flashed; the stop light on the right side may be caused to burn steadily by applying the brake and the tail lamps are disconnected at the direction signal switch should they have been turned on at the lighting switch. During the flashing of the signal lamps the pilot lamp is also flashed.

An advantage of the circuit of Figure 2 is the fact that should the front direction signal lamp burn out the rear direction signal will continue to flash for it is in series with the actuating elements of the flasher. The pilot light is illuminated only when the direction signal switch is closed to indicate a right or left turn and the flasher armature 10 is disengaged from contact 12 and the front signal lamp in series with the pilot light is in operative condition. Under these conditions the voltage drop across the pilot light is so great that the filament of the front signal in series with it is not heated sufficiently to become incandescent. Should the front signal light in series with the pilot burn out the pilot will not be illuminated since the circuit through it is thereby broken. Should the rear signal on the side toward which a turn is being indicated, burn out, the circuit through the flasher is broken and the flasher no longer operates, armature 10 remaining in engagement with contact 12, thereby short-circuiting the pilot light and extinguishing it. Consequently when either the front or rear signal light on the side toward which a turn is being indicated, burns out, the pilot ceases to flash, thereby indicating failure of a signal light. In this connection it is to be pointed out that the direction-signal lights shown at the right margin of the drawings have been denoted "rear" lamps, while those at the left margin of the drawings have been denoted "front" lamps. Such designations are employed purely for purposes of convenience in description and facility in understanding and are not to be construed as words of limitation, it being manifest that the transposition of these pairs of lamps with respect to the front and rear ends of the vehicle would constitute no departure from the concepts of the herein-disclosed system.

Figure 3:
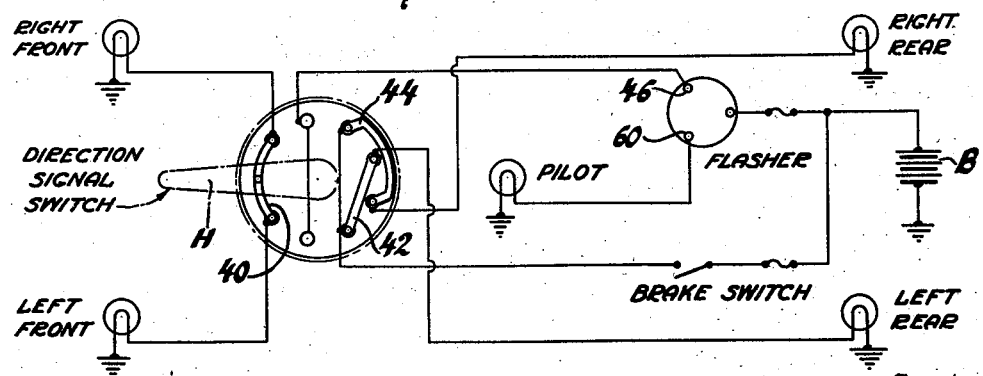
Figures 3 and 4 show a modified form of system embodying a rotatable control switch, Figure 3 showing the direction signal switch in off position and Figure 4 showing it in position to indicate a left turn.
Figure 4:
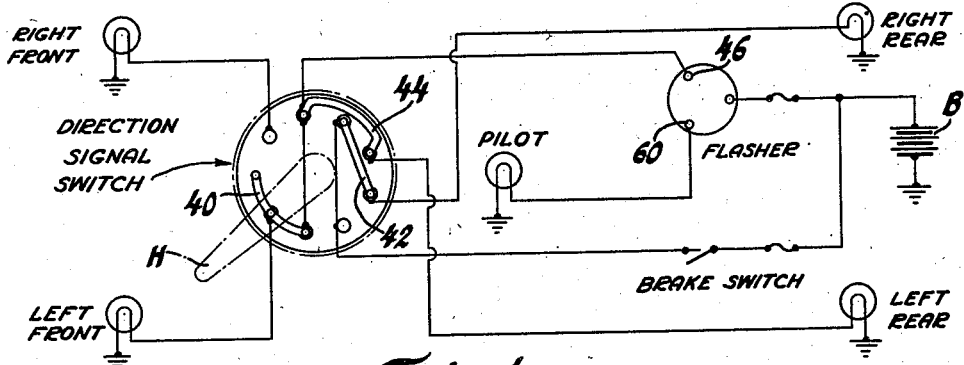

In the modification shown in Figures 3 and 4 a rotatable direction signal switch is employed instead of the reciprocating switch. The rotatable switch consists of insulated conducting segments 40, 42 and 44 which may be shifted to right or left by means of handle H. In these figures there is shown a modified type of flasher having but one output terminal 46. The flasher may be of the construction shown in Figure 7 in which current from the battery is supplied to stamping 48 to which is secured armature 50 tensioned to normally engage contact 52 but restrained by expansible resistance wire 54 connected as shown to terminal 52 and thence to solenoid 56 wound around stamping 48 and output terminal 46. Stamping 48 also carries a second armature 58 adapted to engage contact 60 connected to the pilot light when the solenoid 56 is energized. In the position of parts shown in Figure 7 the flow of current through solenoid 56 is cut down by the resistance 54 so that it is unable to pull the armatures 50 and 58 into engagement with their respective contacts 52 and 60 but the flow of current is sufficient to heat the wire 54 causing it to expand until armature 50 engages contact 52 thereby short circuiting the wire 54 and increasing the flow of current through the solenoid so it is able to pull up armature 58 thereby energizing the pilot lamp. This flow of current is also sufficient to energize the signals. In the description of the circuits of Figures 3 to 6 it will be sufficient to bear in mind that the flashers have but one output terminal 46 functioning on the direction signal lamps, the other output terminal 60 energizing the pilot only.

The circuit shown in Figures 3 and 4 operates as follows: In the position of parts shown in Figure 3 the flasher is inactive since its circuit is broken at the direction signal switch. When the brake switch is closed current flows from the battery B through the brake switch and thence through insulated segment 42 to the left rear stop light and through insulated segment 44 to the right rear stop light. Upon movement of the direction signal switch to the position shown in Figure 4 to indicate a left turn, interrupted current is supplied from output terminal 46 of the flasher through insulated segment 44 of the direction signal switch to the left rear stop light and through insulated segment 40 of the direction signal switch to the left front light. If the brake switch is closed in the position of parts shown in Figure 4 steady current then flows through insulated segment 42 of the direction signal switch to the right rear stop light. The pilot light of course is flashed so long as the flasher is in operation.

Figure 5:
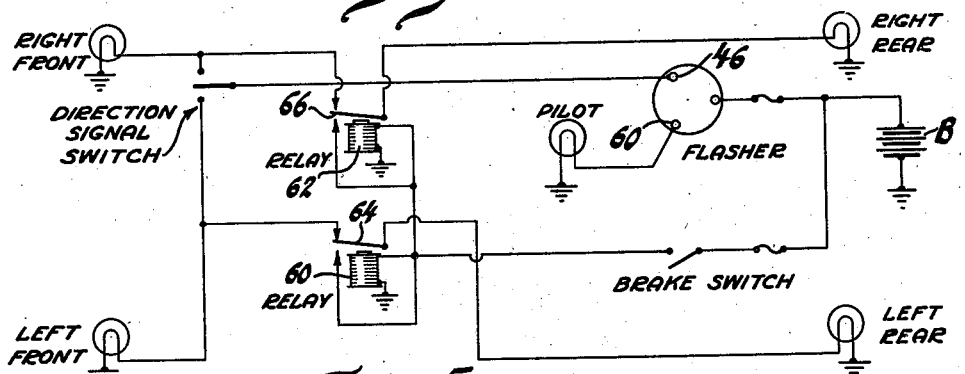
Figure 5 shows a further modification employing relays to energize the signal lights as stop lights.

It is believed that the modification shown in Figure 5 may be sufficiently described by giving its mode of operation. In the position of parts shown in Figure 5 if the brake switch is closed solenoids 60 and 62 are energized, thereby pulling down relays 64 and 66 and closing paths for the supply of current to the left and right stop lights respectively. The closing of the direction signal switch for right or left turn indication supplies interrupted current to the front light and if the brake switch is open, to the stop light on the same side of the vehicle only. If the brake switch is closed both stop lights are supplied with steady current through the operation of the relays. The pilot light of course functions as long as the flasher is operated, with the brake switch open.

Figure 6:
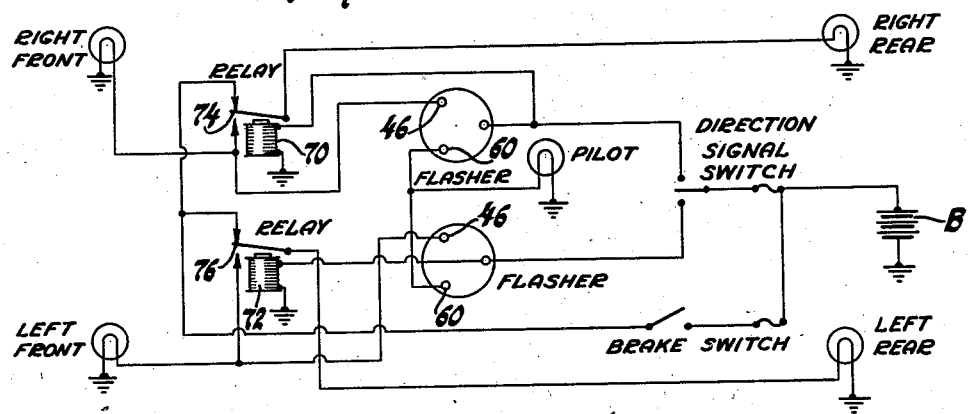
Figure 6 shows a further modification employing a plurality of flashers.
Figure 7:
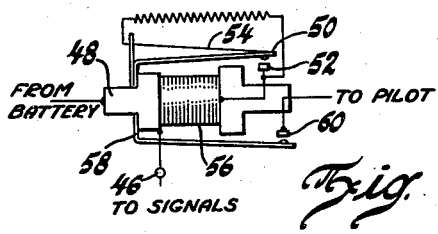
Figure 7 illustrates a suitable form of flasher which may be used with the circuits of Figures 3 to 6 inclusive. In all of the figures like parts are indicated by the same reference characters.

In the modification shown in Figure 6, two flashers are employed as well as two relays. With this circuit it will be evident that with the direction signal switch in neutral position, closing of the brake switch will supply steady current to both of the rear stop lights. With the brake switch open and the direction signal switch thrown to right or left, interrupted current is supplied directly to right or left front direction signal, at the same time steady current is supplied to relay 70 or relay 72 causing it to pull down its armature 74 or 76 thereby closing a circuit for the supply of interrupted current from the output terminals 46 of one or the other of the flashers to either the right or left stop signal as determined by the direction signal switch. The closing of the brake switch when the direction signal switch is in indicating position causes steady current to be supplied to the stop signal on one side only of the car for the circuit to the other stop signal is broken as the result of energization of electromagnet 70 or 72 by the operation of the direction signal switch.

Various modifications will occur to those skilled in the art. Thus, if desired, the circuits shown in Figures 1 to 4 may readily be applied to existing vehicles not equipped with direction signals by supplying the direction signal switch and flasher and replacing the usual single filament parking bulbs in the front fender lamps with two filament bulbs, one filament serving as a parking lamp and the other as the direction signal and making the proper wiring connections indicated.

If desired, the connection between the direction signal switch and the tail lamps shown in Figure 1 may be eliminated so that the tail lamps will be on continuously when the lighting switch is closed. Various other modifications will occur to those skilled in the art.

Figure 8:
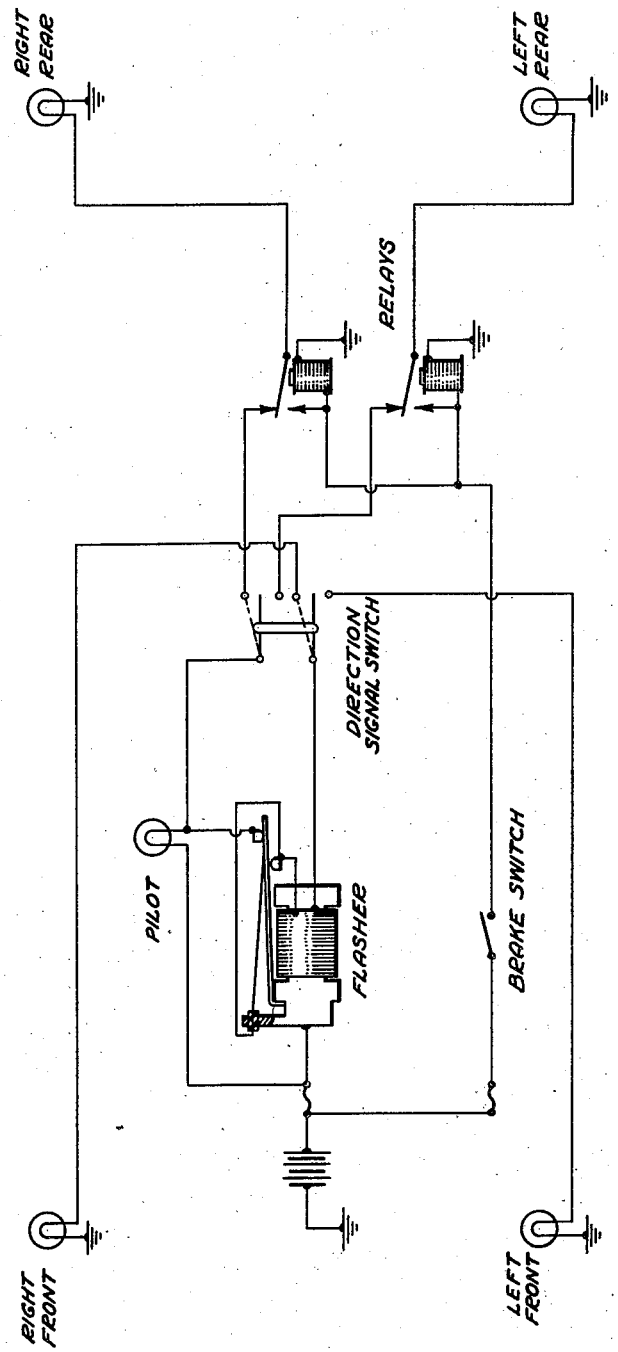
Figure 8 shows a modification of the circuit of Figure 5.

The modification shown in Figure 8 is an improvement on that shown in Figure 5. It is believed that this circuit likewise will be made clear by a description of its operation. Here the direction signal switch is of a double-throw double-pole type. When the switch is in neutral position closing of the brake switch operates through the relays to pull down armatures closing circuits to the rear lamps causing them to burn steadily as stop lights. When the direction signal switch is thrown to either left or right position interrupted current is supplied from the flasher to the front and rear signals on the side determined by the position of the switch. Should the brake switch and the direction signal switch be closed at the same time the rear lamps will burn steadily and the front lamp on the side toward which the turn is to be made will flash but the pilot lamp will be out since its circuit is broken at the relay. This will probably not be a serious inconvenience as the brake switch is normally closed but a short time. The pilot, of course, will properly indicate failure of either front or rear lamp when the brake switch is open as explained in connection with the similar arrangement of Figures 1 and 2.

We claim:

1. An electrical signalling system for vehicles, comprising: a right rear lamp, a left rear lamp, a right front lamp, a left front lamp, and a pilot lamp; a common source of electrical energy applicable to all and capable of energizing any of said lamps, a two-branched conductive circuit for feeding either the right front or the left front lamp from said source, a second two-branched conductive circuit for feeding either the right rear or the left rear lamp from said source, an electrically-operated automatic flasher switch having its intermittent-contact actuating-mechanism series-connected into the trunk of one of said conductive circuits for energization by current flow therein and for periodically interrupting the continuity of said current flow to the selected lamp thereof and to itself, a circuit interrupter in series with the trunk of the other conductive circuit, said circuit interrupter being actuated by the contact-actuating mechanism of said flasher switch to periodically interrupt current flow in said other conductive circuit at the same frequency but in opposite phase to the interruption of current in the flasher-energizing circuit, a third two-branched conductive circuit having both branches jointly controlled by a brake-operated switch for steadily feeding each of said rear lamps from said source to indicate vehicle-brake operation, a master switch having selectively-associable contacts located in each branch of said first and second conductive circuits and conjointly positionable to enable only the alternate intermittent energization of both right lamps, or of both left lamps, or of neither, and having contacts in each branch of said third conductive circuit shiftable conjointly with the recited selective positioning of said first-circuit and second-circuit master switch contacts respectively to open the third-circuit branch feeding the left rear lamp, to open the branch circuit feeding the right rear lamp or to open neither of said third-circuit branches, and circuit means for feeding interrupted current of flasher frequency to said pilot lamp when but only when the right pair of lamps or the left pair of lamps are individually intermittently energized in opposite phase.

2. An electrical signalling system for vehicles, comprising: a right rear lamp, a left rear lamp, a right front lamp, a left front lamp, and a pilot lamp; a common source of electrical energy applicable to all and capable of energizing any of said lamps, a two-branched conductive circuit for feeding either the right front or the left front lamp from said source, a second two-branched conductive circuit for feeding either the right rear or the left rear lamp from said source, an electrically-operated automatic flasher switch having its intermittent-contact actuating-mechanism series-connected into the trunk of one of said conductive circuits for energization by current flow therein and for periodically interrupting the continuity of said current flow to the selected lamp thereof and to itself, a circuit interrupter in series with the trunk of the other conductive circuit, said circuit interrupter being actuated by the contact-actuating mechanism of said flasher switch to periodically interrupt current flow in said other conductive circuit at the same frequency but in opposite phase to the interruption of current in the flasher-energizing circuit, a third two-branched conductive circuit having both branches jointly controlled by a brake-operated switch for steadily feeding each of said rear lamps from said source to indicate vehicle-brake operation, a master switch having selectively-associable contacts located in each branch of said first and second conductive circuits and conjointly positionable to enable only the alternate intermittent energization of both right lamps, or of both left lamps, or of neither, and having contacts in each branch of said third conductive circuit shiftable conjointly with the recited selective positioning of said first-circuit and second-circuit master switch contacts respectively to open the third-circuit branch feeding the left rear lamp, to open the branch circuit feeding the right rear lamp or to open neither of said third-circuit branches, and a circuit for flashing said pilot lamp when but only when the right pair of lamps or the left pair of lamps are individually intermittently energized in opposite phase, said last circuit consisting of said pilot lamp, a conductor directly connecting one terminal of said source of electrical energy to one terminal of said pilot lamp, a second conductor connecting the other terminal of said pilot lamp to the trunk of one of said two-branched circuits controlled by the first-recited selector contacts of said master switch, electrically conductive means periodically brought into shunting relation with said pilot lamp by said flasher-switch actuating mechanism during a portion of each cycle of flasher-switch operation, and electrical resistance in that portion of said circuit which is periodically shunted out by said last-mentioned means, said electrical resistance having a value such as to limit current flow in the circuit, unshunted, to an amount insufficient to effect perceptible energization of any other of the lamps in series therewith.

ROBERT N. FALGE.
GEORGE W. ONKSEN, Jr.
HOWARD I. SLONE.